(12) United States Patent
Lyon

(10) Patent No.: US 9,090,146 B2
(45) Date of Patent: Jul. 28, 2015

(54) VEHICLE DESIGN FOR SOLDERED GLAZING CONNECTOR

(75) Inventor: Michael Lyon, Bickerstaffe (GB)

(73) Assignee: PILKINGTON GROUP LIMITED, Lancashire (GB)

( * ) Notice: Subject to any disclaimer, the term of this patent is extended or adjusted under 35 U.S.C. 154(b) by 115 days.

(21) Appl. No.: 13/989,671

(22) PCT Filed: Nov. 25, 2011

(86) PCT No.: PCT/GB2011/052321
§ 371 (c)(1),
(2), (4) Date: Jun. 14, 2013

(87) PCT Pub. No.: WO2012/069846
PCT Pub. Date: May 31, 2012

(65) Prior Publication Data
US 2013/0257104 A1    Oct. 3, 2013

(30) Foreign Application Priority Data

Nov. 25, 2010 (GB) .................................. 1020014.5

(51) Int. Cl.
*H05B 3/00* (2006.01)
*B60J 1/00* (2006.01)
(Continued)

(52) U.S. Cl.
CPC .. *B60J 1/00* (2013.01); *B60J 1/004* (2013.01); *B60J 1/006* (2013.01); *H01Q 1/12* (2013.01); *H01Q 1/1271* (2013.01); *H05B 3/84* (2013.01); *H05B 3/86* (2013.01); *H05B 2203/016* (2013.01)

(58) Field of Classification Search
CPC ....... H05B 3/86; H05B 2203/016; H01Q 1/12
USPC ............ 296/84.1, 96.21; 237/12.3 R; 165/43; 219/203
See application file for complete search history.

(56) References Cited

U.S. PATENT DOCUMENTS 4,415,196 A * 11/1983 Baum et al. .................... 296/201
4,453,669 A    6/1984 Karla et al.
(Continued)

FOREIGN PATENT DOCUMENTS

DE    36 04 437 A1    8/1987
DE    196 27 052 A1    1/1998
(Continued)

OTHER PUBLICATIONS

Great Britain Search Report dated Mar. 8, 2011, issued by the Great Britain Patent Office, in corresponding Great Britain Patent Application No. 1020014.5. (2 pages).
(Continued)

*Primary Examiner* — Joseph D Pape
(74) *Attorney, Agent, or Firm* — Buchanan Ingersoll & Rooney PC

(57) ABSTRACT

A motor vehicle has a body and a glazing, wherein the body is adapted to receive the glazing and have the glazing secured to the body. The glazing has at least one electrical component and at least one soldered electrical connector located thereon. The soldered electrical connector is arranged to be clamped between the glazing and a vehicle component upon securing the glazing to the body. This is achieved by including a resilient member, a protrusion, a flange or a lip on the vehicle to engage the soldered connection. The resilient member may be of an elastomeric material to provide a biasing force and thereby provide additional retaining support. The resilient member may be held in place by bonding. The soldered connection may be a lead free solder composition. Insulation of the soldered connection may be included. The arrangement reduces likelihood of damage to the soldered connection due to vibration.

7 Claims, 4 Drawing Sheets

(51) Int. Cl.
*H01Q 1/12* (2006.01)
*H05B 3/84* (2006.01)
*H05B 3/86* (2006.01)

(56) References Cited

U.S. PATENT DOCUMENTS

| | | | |
|---|---|---|---|
| 5,208,095 A * | 5/1993 | Nietering | 428/215 |
| 6,025,806 A | 2/2000 | Deininger | |
| 2002/0166852 A1 | 11/2002 | Kim | |
| 2003/0162415 A1 | 8/2003 | Spaulding et al. | |
| 2005/0099346 A1 | 5/2005 | Gelman | |
| 2010/0212959 A1 | 8/2010 | Flick | |

FOREIGN PATENT DOCUMENTS

| | | |
|---|---|---|
| DE | 10 2007 046 320 A1 | 4/2009 |
| DE | 10 2009 005 294 A1 | 7/2010 |
| EP | 1367669 A1 | 12/2003 |
| FR | 2649650 A | 1/1991 |
| JP | 2005332644 A | 12/2005 |

OTHER PUBLICATIONS

International Search Report (PCT/ISA/210) issued on Mar. 6, 2012, by the Great Britian Patent Office as the International Searching Authority for International Application No. PCT/GB2011/052321.

* cited by examiner

VEHICLE DESIGN FOR SOLDERED GLAZING CONNECTOR

FIELD

The invention is concerned with electrical connections made to devices such as resistive heaters and antennas which are incorporate on vehicle glazings.

BACKGROUND

Incorporation of electrical elements such as heating elements and radio antennas, in vehicle glazings is a well established practice. Typically, such elements are connected to other electrical equipment on the vehicle, such as power supplies or amplifiers and radio signal receivers, by a soldered connection located on a surface of the vehicle glazing. The soldered connection might conveniently be located in the obscuration band—a region of dark ceramic ink in the periphery of the glazing. Thus the soldered connection is rendered invisible from the exterior of the vehicle, giving a more aesthetically pleasing result.

Traditional solders contain lead. These perform well but lead is known to be poisonous and lead free alternatives providing similar performance would be preferable. The use of lead free solders is known in the automotive industry and elsewhere but in many cases, they fall short of the performance demanded by vehicle manufacturers.

Often, lead free solders have a high in content. Such solders perform well in some respects, exhibiting good wettability and strength of bond, but for automotive applications, a high occurrence of stress faults are associated with such solders.

These stress faults may manifest themselves as blisters in the black ink of the obscuration band (particularly on toughened glass) or as cracks in a ply of laminated glazings. The stress faults are associated with differential thermal expansion and contraction between the solder and glass during the soldering operation.

Soldered joints may also be weakened by the temperature fluctuations experienced in service and by other mechanisms such as corrosion.

The resistance of lead free solders to thermal stress faults in particular may be increased by incorporating other elements such as indium in the solder alloy. However, there is an associated trade-off as the melting point of the solder, and its performance at higher temperatures, is reduced. The in-service temperatures encountered in some applications, e.g. in southern Europe, are frequently high enough to cause creep of the solder to the extent that the joint is unacceptably compromised.

Thus, a lead free solder which meets all of the requirements laid down by vehicle manufactures and legislators remains undiscovered.

RELATED ART

Other approaches to the problem of achieving reliable electrical connections in automotive applications without the use of lead in solders, include supplementing or complementing the solder with other bonding means. For example, adhesive may be used to supplement the bonding action of the solder or the adhesive may be arranged to provide substantially all of the bond strength with the solder providing good electrical continuity.

DE 196 27 052 A1 discloses an antenna connector, comprising a connection surface on the glazing, a contact surface pressed by spring force against the connection surface and an insulating layer arranged therebetween, so as to provide a coupling capacitor.

DE 036 04 437 A1 discloses a glazing, comprising a busbar, and a contact element comprising contact surfaces which rest in a sprung manner against the busbar.

U.S. Pat. No. 4,453,669 discloses an electrically heated glazing comprising a glass pane, heating conductors and a connecting element soldered to the conductors. Added stability is provided by adhesive between the connecting element and a frame of an automobile.

SUMMARY

Nevertheless, there remains an ongoing requirement for soldered connections to electrical elements on vehicle glazings which are more robust and reliable. According to the invention, this solution is provided by apparatus according to claim 1.

In a preferred embodiment, the soldered electrical connector is arranged to engage a portion of the body upon securing the glazing thereto.

A further preferred embodiment comprises a resilient member arranged to engage the soldered connector upon securing the glazing to the body.

In another embodiment the vehicle body includes a protrusion arranged to engage the soldered connection when the glazing is secured to the vehicle body. The protrusion may be resilient. The protrusion may be realised as a discrete component, fastened to the vehicle body or it may by an integral part of the body.

The vehicle body may include a flange or lip, suitable for securing the glazing thereto.

Another embodiment comprises a resilient component secured to the glazing, the resilient component being arranged to engage the vehicle body upon securing the glazing to the body and thereby to be biased against the connector, clamping the same against the glazing.

Preferably, the soldered connector comprises a lead free solder.

By the current invention the vehicle body is designed to provide physical support to a soldered connector on a glazing when the latter is installed in the vehicle. Thus, the forces employed to retain the glazing in situ are also exploited to retain the connector. Should the solder fail, the connector is still held in place.

The invention is particularly useful when used in combination with lead free soldered connections, thus avoiding the negative consequences of using lead while still providing a connection of satisfactory reliability.

BRIEF DESCRIPTION OF DRAWING FIGURES

The invention will now be described, by non-limiting example, with reference to the attached figures in which:

FIG. 1b is a cross-sectional view on the line XX of FIG. 1a;

DETAILED DESCRIPTION

Any feature appearing in more than one figure is represented by the same numeral throughout. The figures are not to scale and the relative sizes of some components are exaggerated for illustration purposes.

Figure 1A:
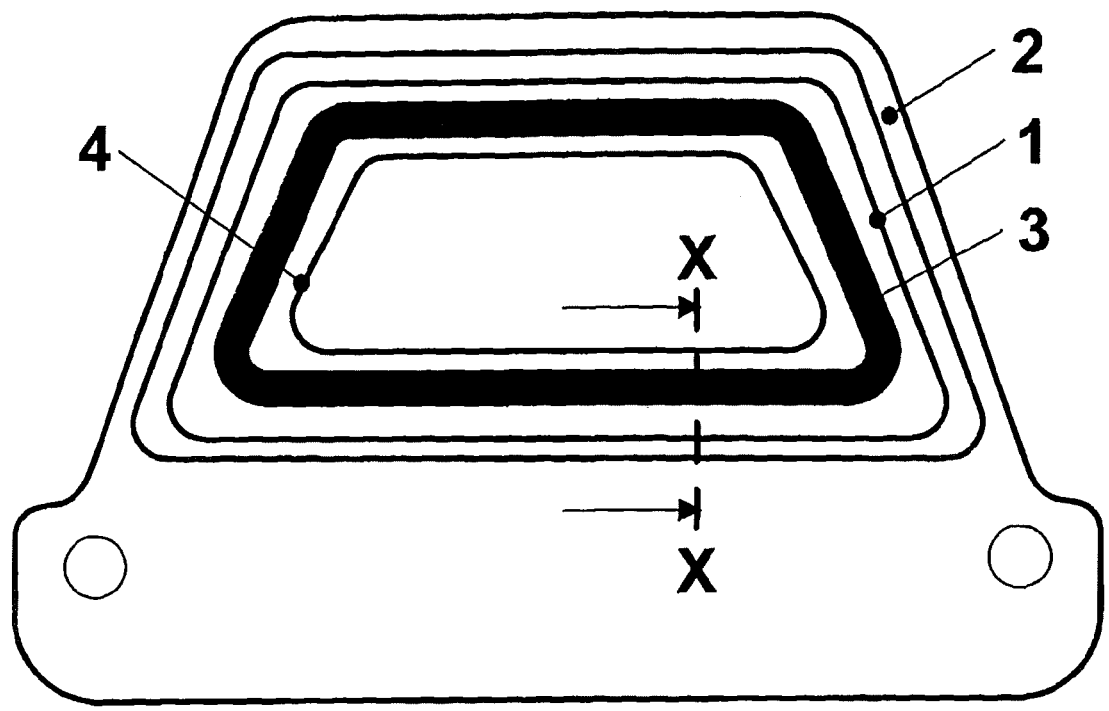
FIG. 1a illustrates a typical vehicle glazing installation of the prior art.
Figure 1B:
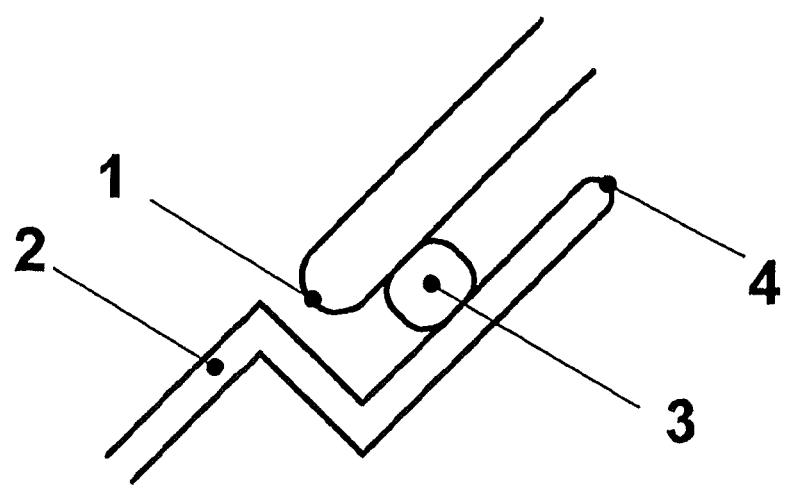

Referring to FIGS. 1a and 1b, in a typical motor vehicle, a glazing 1 such as a windscreen, backlight or sunroof is located in a suitably adapted location of the vehicle body 2 and secured by a bead 3 of bonding material such as polyurethane adhesive.

The location may include a recessed lip or flange 4, incorporated in the vehicle body, which provides the bonding site. However, in some designs there is no discrete lip and the glazing is simply secured over a suitably shaped aperture. The invention is applicable to both of these designs and to designs incorporating other features.

The skilled person will be aware that other features such as additional sealing beads or glazing support features incorporated in the vehicle body may be included but these are omitted for clarity. Their realisation is within the knowledge of a skilled person without further description here.

Figure 2:
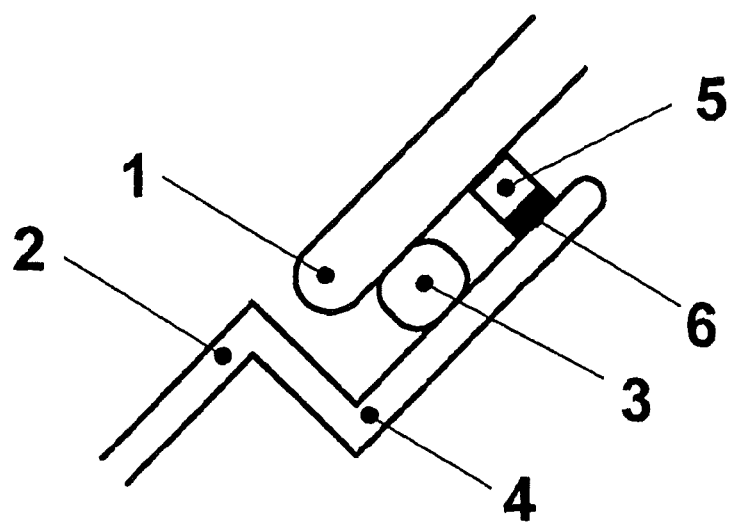
FIGS. 2, 3, 4a and 5 show a similar views to FIG. 1b and illustrates various embodiments of the invention.

Referring to FIG. 2, in a simple embodiment of the invention, a soldered connection 5 is arranged to engage with a part of the vehicle body (in this case, against lip 4) when the glazing is installed. Thus the connector 5 is clamped between glazing 1 and lip 4 and additional support for retaining connector 5 in place is provided. It will be apparent to the skilled person that some form of electrical insulation may be required between the conducting parts of connector 5 and the typically metal vehicle body such as lip 4. This insulation could be realised in many ways, for example as a feature of the connector; an insulated region of lip 4 or an additional element incorporated between the connector 5 and the lip 4. In FIG. 2, the insulation is represented schematically by heavy line 6.

Figure 3:
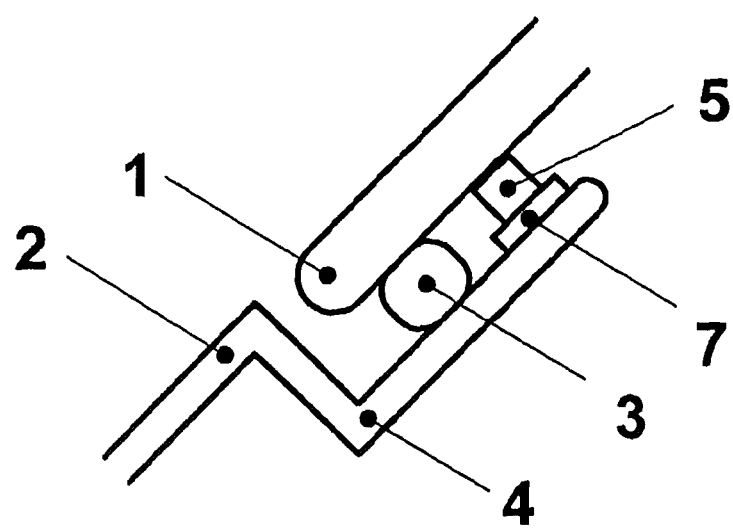

Referring to FIG. 3, a preferred embodiment of the invention includes a resilient component 7 located between the vehicle body (in this case, lip 4) and the connector 5. Resilient component 7 is arranged to provide a biasing force on connector 5 when the glazing 1 is installed and thereby to provide additional retaining support. Use of a resilient component 7 provides protection from damage due to excessive force on the connector 5 and reduces the likelihood of damage in service due to vibration.

Resilient component 7 is typically formed in an elastomeric material which may also provide the necessary electrical insulation between connector 5 and lip 4. Prior to installation of glazing 1, it may conveniently be located on the connector or at a suitable location on the vehicle body and held in place by bonding.

Figure 4A:
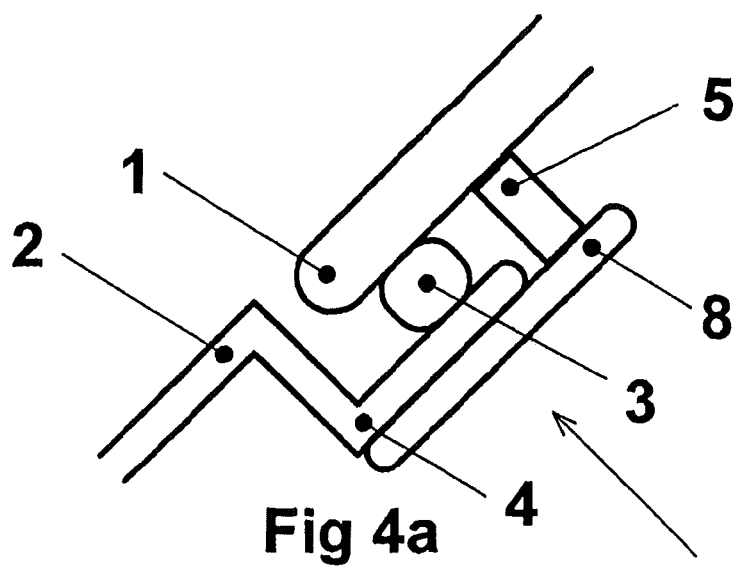
Figure 4B:
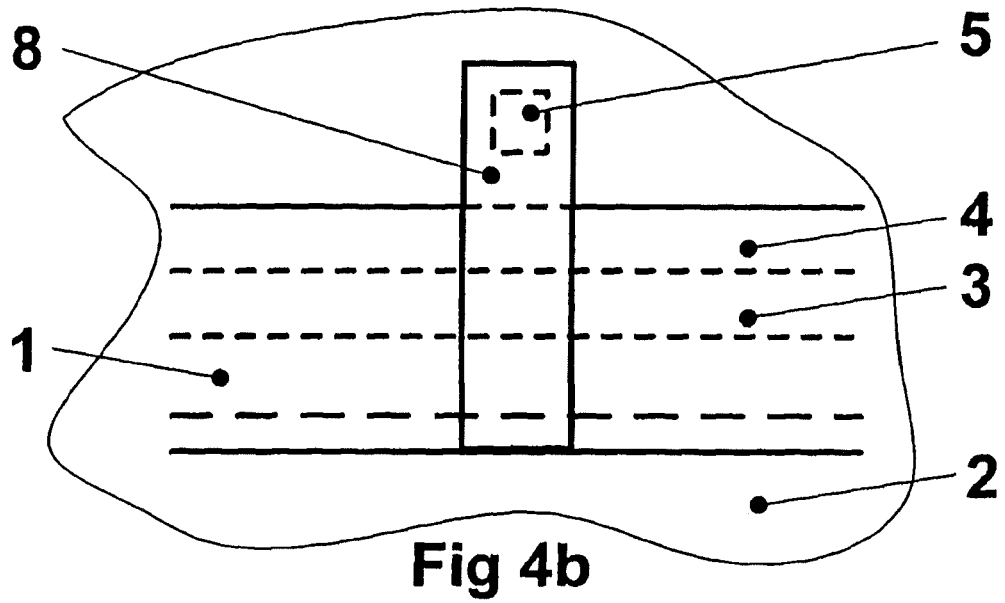
FIG. 4b shows a view of the embodiment shown in FIG. 4a, as seen along the direction indicated by the arrow

Referring to FIGS. 4a and 4b, another preferred embodiment employs a protrusion 8 extending from the vehicle body (in this case, from lip 4) to engage connector 5 and provide additional retaining support. Protrusion 8 may be formed in a resilient material such as polymer or spring steel. Insulation may be included as required.

Figure 4C:
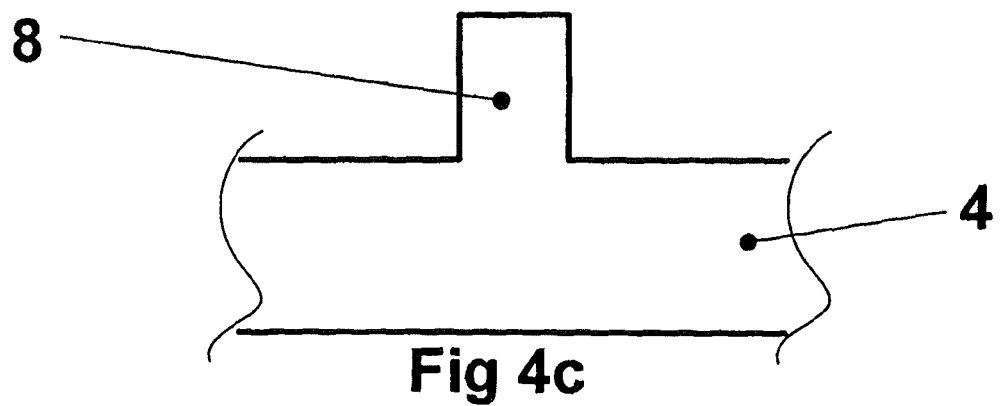
FIG. 4c illustrates a variation on the embodiment shown in FIGS. 4a and 4b.

FIGS. 4a and 4b suggest that protrusion 8 is a discrete component which is attached to lip 4. Attachment could be achieved inter alia by bonding, resistance welding or riveting. However, protrusion 8 may conveniently be realised as in integral part of the vehicle body, for example the lip 4 (see FIG. 4c).

Figure 5:
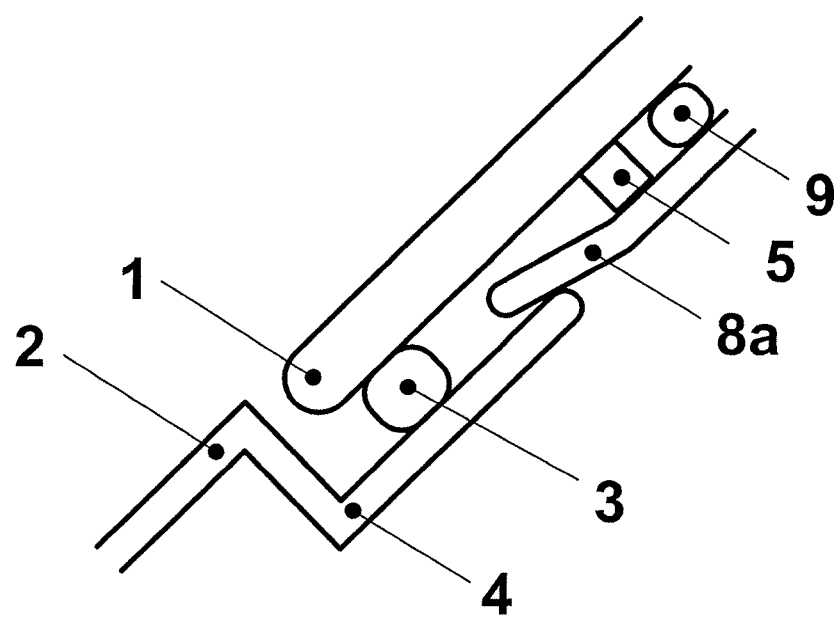

Referring to FIG. 5, in an alternative embodiment, protrusion in the form of a finger 8a is fixed to the glazing 1 by bonding material 9. Finger 8 is arranged to engage with lip 4 on installation of glazing 2 and thereby to push against connector 5 to provide additional retaining support. Again, finger 8a may be formed in resilient material.

The invention claimed is:

1. A motor vehicle having a body and a glazing,
the body being adapted to receive the glazing and have the glazing secured thereto;
and the glazing having at least one soldered electrical connector located thereon,
wherein the soldered electrical connector is arranged to be clamped between the glazing and a component of the vehicle upon securing the glazing to the body,
wherein:
a resilient component is secured to the glazing, the resilient component being arranged to engage the vehicle body upon securing the glazing to the body and thereby to be biased against the connector, clamping the connector against the glazing.

2. A motor vehicle according to claim 1, wherein the soldered electrical connector is arranged to engage a portion of the body upon securing the glazing thereto.

3. A motor vehicle according to claim 2, wherein the resilient component is arranged to engage the soldered connector upon securing the glazing to the body.

4. A motor vehicle according to claim 2, wherein the vehicle body includes a resilient protrusion arranged to engage the soldered connection when the glazing is secured to the vehicle body.

5. A motor vehicle according to claim 4, where the resilient protrusion is an integral feature of the body.

6. A motor vehicle according to claim 1, wherein the vehicle body includes a flange or lip for securing the glazing thereto.

7. A motor vehicle glazing according to claim 1, wherein the soldered connection comprises a lead free solder.

* * * * *